United States Patent [19]

Neil

[11] Patent Number: 4,696,982

[45] Date of Patent: Sep. 29, 1987

[54] PROCESS FOR REMOVING RESIDUAL SALTS FROM EPOXY NOVOLACS

[75] Inventor: Lawrence E. Neil, Angleton, Tex.

[73] Assignee: The Dow Chemical Company, Midland, Mich.

[21] Appl. No.: 908,539

[22] Filed: Sep. 17, 1986

[51] Int. Cl.[4] .................. C08G 59/06; C08G 59/08
[52] U.S. Cl. .................. 525/507; 528/87; 528/499
[58] Field of Search ............ 528/87, 499; 525/507

[56] References Cited

U.S. PATENT DOCUMENTS

| | | | |
|---|---|---|---|
| 3,296,157 | 1/1967 | Brojer et al. | 528/87 X |
| 4,447,598 | 5/1984 | Caskey et al. | 528/87 X |
| 4,511,710 | 4/1985 | Wang et al. | 528/87 X |
| 4,585,838 | 4/1986 | Wang et al. | 528/87 X |
| 4,617,357 | 10/1986 | Pallie et al. | 528/87 X |

Primary Examiner—Earl Nielsen

[57] ABSTRACT

A method for purification of phenolic epoxy novolac or phenolic derivative epoxy resin intermediates is disclosed. At the time of manufacture, the epoxy resin is a flowing stream with a solvent and with impurities, typically being dispersed residual salt ions, particles of the catalyst used in the manufacturing process, and solidified polymer. The epoxy resin is mixed with water dispersed therethrough in droplet form. Then, the epoxy resin is flowed through an electrostatic coalescer means. The water droplets are coalesced and form a water phase in the bottom of the coalescing means, thereby picking up substantially all the impurities. As desired, two or more electrostatic coalescing means can be cascaded to obtain a desired degree of purification.

15 Claims, 1 Drawing Figure

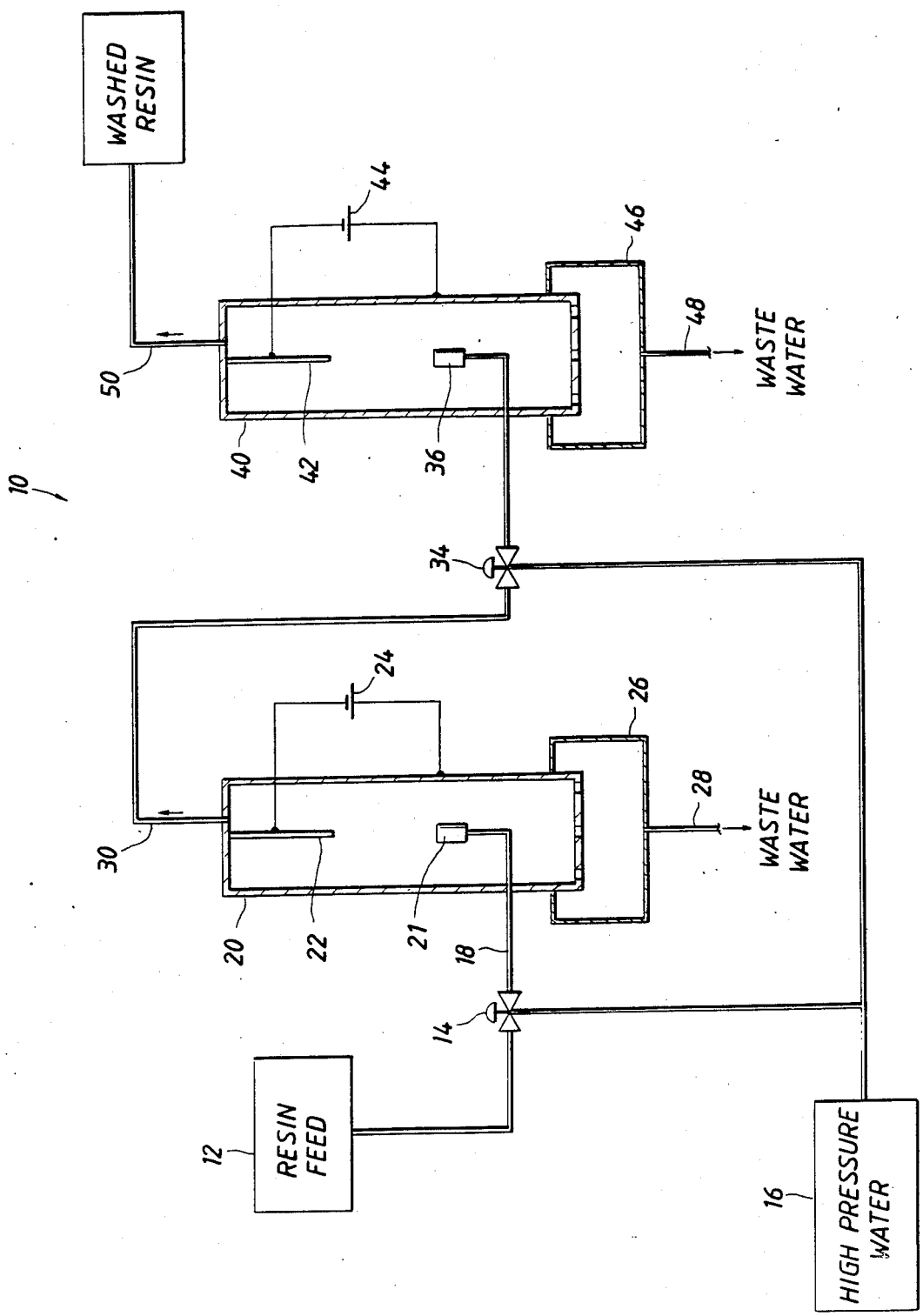

PROCESS FOR REMOVING RESIDUAL SALTS FROM EPOXY NOVOLACS

BACKGROUND OF THE DISCLOSURE

This disclosure is directed to an improved process which removes residual salts, catalytic materials and particles of polymer that have solidified from a stream of phenolic epoxy novolac or phenolic derivative epoxy resin intermediates or a mixture with methyl isobutyl ketone. In the method of manufacture of large quantities of such resins, the process involves intimate contact with chloride ions. It also involves intimate contact with dispersed particulate catalytic materials. The process is intended to make the intermediate, meaning the epoxy resin in a solvent. Such a process provides a quality rsin intermediate, but the quality of this intermediate is degraded by dispersed residual salt ions (in particular chloride ions), catalytic particles and solidified polymer flowing in the intermediate stream. Ideally, the stream is primarily the resin flowing with a solvent. It is desirable to remove the residual salts and especially the chloride ions, catalytic particles and solid polymer particles. By one approach, a coalescer can be used to separate impurities. Coalescers known heretofore have operated primarily as a mechanical filter utilizing a filter element to remove the impurities. Filters tend to clog, causing plugging and channeling through the filter material. It is believed that the purification process described hereinbelow yields a more consistent and high quality, low impurity product stream over a wide range of impurity concentrations. It is not as susceptible to plugging and channeling typical of packed fiber mechanical style coalescing devices.

Another problem which may occur in a coalescent device is the accumulation of emulsion forming a floc separating from the product stream. In other instances, there may be a rag layer having a relatively high surface tension formed on the liquid level interface. Moreover, such irregularities floating on the surface of a liquid body makes emulsion separation more difficult. This difficulty is in part overcome by introducing a mixed phase flow into an electrostatic coalescer utilizing an electrical field and thereby separating the emulsion into separate phases. This is distinctly desirable in contrast with the mechanical coalescer packed with filter fibers. In other words, the electrostatic coalescing process disclosed herein will operate over a wider range of feed impurities and will remove a wide range of impurities in the intermediate resin stream.

Electrostatic separation is very difficult to accomplish in view of the fact the solvent is normally conductive, perhaps highly conductive. The solvent can be selected to reduce conductivity somewhat; however, the conductivity is normally increased by the ubiquitous nature of the chloride ion. Even further, the chloride cation is typically sodium or potassium, normally a conductive cation.

BRIEF SUMMARY OF THE PRESENT DISCLOSURE

This disclosure is directed to a process and an apparatus for implementation of the process for removing residual salts and other materials from an epoxy novolac resin intermediate. A feed of resin in a solvent burdened with chloride ions, solid particles of the polymerized material, and particles of distributed catalytic material is first of all supplied to a mixing means for mixing with water under high pressure. The water is introduced in a controlled ratio to the intermediate. They are mixed by introducing the water in the form of a fine spray to form an emulsion of the resin intermediate and water. Alternative water dispersion devices can be used. In turn, this dispersion is introduced to an electrostatic coalescer featuring a central charged rod or ring in the coalescer. The emulsion is electrostatically separated into the two components. The heavier water settles to the bottom and the lighter resin is discharged at the top. This separation process involving mixing with water in the form of fine droplets to form an emulsion with the resin intermediate is repeated for two or three cycles. Moreover, in each cycle of emulsification and then coalescing to separate the phases, a large percentage of the remaining impurities is removed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawing.

It is to be noted, however, that the appended drawing illustrate only typical embodiments of this invention and are therefore not to be considered limiting of its scope, for the invention may admit to other equally effective embodiments.

The only view shows an electrostatic coalescing system used for purification of phenolic epoxy novolac resin intermediates, the apparatus discharging a washed resin separated from the materials in the resin.

DETAILED DESCRIPTION OF THE PREFERRED EMBODIMENT

In the drawing a purification system is identified by the numeral 10. This system is particularly adapted to purify a feed stream of phenolic epoxy novolac resin intermediate. The numeral 12 identifies a resin feed source. Presumably, it manufactures the resin in large quantity delivered as a constant stream of polymer with a solvent. The stream is often a mix of liquid epoxy novolac (LEN) with a solvent or solvent mixture. The stream may be other phenolic derivative epoxies; e.g., cresols. This stream includes variable quantities of undesirable materials mixed in the resin intermediate. Thus, the typical impurities arise from the manufacturing process used to make the resin intermediate stream (LEN and solvent). Typically, this includes residual salts, and the most common form of salt is chloride ions. The salts are typically mixed in the stream in quantities increasing from negligible to several thousand parts per million (PPM) or even a slurry. In addition, the manufacturing process involves intimate commingling with a particulate catalyst material. Small particles of the catalyst are regrettably carried away in the resin intermediate stream, being difficult or almost impossible to totally separate for recycling of the catalyst. Last of all, another common impurity includes small particles of the polymer in the stream which solidify. While most of the polymer in the stream may remain fluid, in polymerization, insoluble polymer particles will accidentally form to define another impurity. In summary, there are three typical classes of impurities to be removed including residual salts, particulate catalytic materials, and solid polymers formed of the polymer.

The resin intermediate stream is hopefully substantially pure resin typically flowing in a solvent. This flow is introduced from the resin feed source at 12 to a mixing valve 14. The adjustable mixing valve 14 is provided with water (preferably deionized water) from a source at 16, the water being delivered at a substantial pressure. The mixing valve 14 is adjusted to provide a specified ratio between the two phases and adjustable droplet size. The water is typically introduced in smaller quantities than the resin feed and a typical ratio mixes the water in the range of zero to about 20% with the resin. The mixture is carried from the valve 14 by a supply line 18 and delivered to an electrostatic coalescing apparatus 20 through an inlet diffuser 21 to distribute the emulsion. A typical laboratory size unit is about 3 inches ID and about 28 inches in height. The housing encloses an upstanding cylindrical conductive rod 22. The rod is typically about $\frac{1}{4}$ inch in diameter and extends substantially along the housing axis from the top. Rod length will be discussed later. It is connected to a voltage supply. The rod 22 is connected to a power voltage supply 24 while the other power supply terminal is connected to a wire mesh screen placed inside the cylindrical member comprising the ground electrode. The screen is placed just at the interior of the housing. The rod is connected to one terminal of the power supply 24 and the other terminal is connected to the screen on the interior of the cylindrical housing 20. While it is possible to use a DC voltage source, an AC source is the preferred form. In either case, there is a cylindrical ground plate which has the form of a metallic wire screen mesh on the inside of the cylinder. The ground plate cooperates to form an electrostatic field across the cylinder to the central rod 22. The ground can alternately be a solid cylinder. In this arrangement, a suitable electrostatic voltage stress is placed across the structure to properly electrostatically separate phases as will be described.

The cylinder 20 connects to a settlement container 26 at the bottom. A waste disposal line 28 is connected from that container. Additionally, the top of the cylinder provides a point of exit for a flow line 30. In the arrangement shown, the heavier components in the liquid flow are discharged out the bottom. This discharge is labeled waste water in the drawing. The lighter of the two phases is discharged through the line 30 connected with the top of the cylinder. The lighter constituent after separation is removed by this line. The line 30 is connected to another mixing valve 34 which is identical to the mixing valve 14. Also, the mixing valve 34 is connected to the high pressure water source at 16. This mixing valve is adjusted so that the partially washed resin feed delivered to the line 30 is mixed again with another flow of water. The water (variable in amount from none to a select flow rate) that is introduced is distributed in the form of fine particles or droplets through a distributor or diffuser 36. The distributor is a sleeve with a plurality of tiny holes drilled in the wall to enable tiny droplets to flow into the housing. Other forms of distributors can be used. The water introduction forms a two-phase emulsion which is then introduced into a cylindrical housing 40. This defines a second electrostatic coalescer similar to the first coalescer 20. In like fashion, it has a suitable central rod 42 which is connected in a suitable electrical circuit comprising a voltage source such as a battery 44. In turn, the opposite supply terminal is connected with a wire mesh placed just inside the cylinder. There is an outlet line 50 at the top for removing the lighter of the separated phases. In addition, the numeral 46 identifies a settlement container at the bottom for accumulating the heavier constituents including the waste water. That is discharged through a waste water outlet line 48. In general terms, the two coalescers at 20 and 40 can be similar or even identical, identical to the last detail. They operated in similar fashion and are connected in cascade to process up to N cascaded consecutive purification passes.

The mixing valves 14 and 34 introduce a flow of water in the form of water droplets. The droplets are picked up in the flowing stream of epoxy intermediates. The dispersion of the water droplets through the stream forms the two phase mixture. This mixture is formed of a suitable ratio typically up to about 20% by volume of water. The droplets are dispersed in small droplet form to achieve intimate contact with the epoxy intermediate. chamber. This intimate contact assures that the water contacts the impurities in the epoxy intermediate stream. This enables salt ions (as an example) to move from the epoxy resin into water solution. In other words, an individual ion will migrate through the water-epoxy interface into the water droplet. As the droplets are made smaller and smaller, the dispersion will more intimately contact the flowing epoxy intermediate. Intimate contact of water and organic enables the impurities to collect in the water. The water thus becomes impure while the organic becomes purer. The impurities collect in the water which is removed to carry the impurities out of the organic. The precise nature of the mixing value can vary; a shear pump can be used or any other device which forms a water dispersion in the organic stream.

Operation of the system should be considered by review of several examples. First of all, a single pass unit will be described. The structure (a laboratory device) was constructed with approximately a three inch ID cylinder about 28 inches in length. The central rod or electrode was approximately $\frac{1}{4}$ inch in diameter with the deployed wire mesh serving as a cylindrical electrode about the rod. The rod was approximately concentric relative to the surrounding electrode. The mesh spacing on the grounding electrode is not relatively critical. Indeed, sheet metal can be used on the interior of the cylinder. Phase separation is added by density differences in the two phases.

It should be noted that the central rods 22 and 42 are located at the top. While it is structurally possible for them to extend the full length of the surrounding cylindrical housing, the preferred form is a rod which extends from the top but does not span the full length of the housing. Rod length increases surface area and thereby increases current flow. Preferably, in a typical structure of about $\frac{1}{4}$ inch in diameter located in a three inch ID cylinder standing about 28 inches tall, suitable rod length is between one and two inches. A suitable diameter is around $\frac{1}{4}$ inch although $\frac{3}{8}$ inch will suffice. In the alternative, it is possible to use a short cylindrical ring of thin metal which is about two inches in diameter and standing less than one inch tall. The current flow is from the rod or ring suspended at the top of the structure. This reduces current flow to assure that excessive heating does not happen as might be the case should the rod provide an excessive surface area. The relationships between rod surface area and current flow suggests that the preferred shape of rod is relatively short in contrast with the cylindrical housing. In the example just given, a rod in the range of about one to two inches will suffice for a cylindrical housing of 28 inches height. This can be scaled upwardly or downwardly depending on the size of the cylindrical housing.

Table I below lists several examples of the apparatus in use and the results obtained. The first entry is the organic flow rate and should be contrasted with the water flow rate. The water normally need not be more than 20% of the mixture. In the entries describing the voltage source it will be noted that the voltage was varied over a wide range, and in one instance a DC source was used. The current likewise varied over a wide range. The temperature increase is a result of this processing step and indicates that some heat is generated by the current flow in the separation process. The chloride ions were significantly reduced, and solids in the epoxy intermediate were likewise reduced. The examples listed in Table I show different feeds with different measures of impurities and the reduction obtained by this processing step.

TABLE I

|  | Example #1 | Example #2 | Example #3 | Example #4 | Example #5 |
|---|---|---|---|---|---|
| Organic Feed Rate (cc/min) | 400 | 350 | 340 | 340 | 220 |
| Water Flow (cc/min) | 42 | 44 | 40 | 40 | 10 |
| Voltage (KVAC) | 13.0 | 4.0 | 1.0 | 3.5 | 0.583 |
| Amperage (MA) | 35 | 19 | 6 | 16 | 45 |
| Temperature Increase (°C.) | 5° | 9° | 2.4° | 5.5° | 8.8° |
| Original Chloride Conc | 35 ppm | 0.23% | 150 ppm | 71 ppm | slurry |
| Treated Chloride Conc | 1 | 1.9 | 2 | 5 | 77 |

In the table above, the term slurry refers to salt crystals and/or polymer particles. The present process handles either without regard to particle size or hardness. This process can remove any measure or weight of slurry by settling such particles to the bottom for disposal out the waste water flow path. This is much easier than mechanical coalescers. In a mechanical system, the salt must be converted into solution to avoid filter clogging or blinding with particulate matter. Further, the particulate removal is successful without regard to the particle size, hardness or flocculation.

The foregoing examples are illustrative of the purification. In the last example, the salt slurry was so heavy with impurities that the mixture was highly conductive. A reduced voltage was applied and significant separation was achieved. High conductivity may arise from salt slurry, a more conductive solvent, or both. The slurry chloride concentration was not measured other than noting it was very high, much higher than would ordinarily be encountered.

One important factor is use of AC current to break or interrupt possible bridging across electrodes. Such bridging may form a short across the cylinder, localizing current flow and reducing bulk impurity movement. Such shorts are broken with current reversal.

As will be understood, the foregoing electrostatic separation and purification process can be used with LEN and solvent intermediate streams with exceedingly high measures of impurities. It particularly is successful with the process described herein, namely the preliminary step of washing with water to enable the chloride ions to migrate from the organic into water solution, thereby being more easily removed with the water. In using a multiple pass system of N stages (where N is an integer) successive passes can be used to reduce the chloride concentration in cascade so that exceeding high concentrations are of soft slurry residue and particles of polymer can thereby be removed.

While the foregoing is directed to the preferred embodiment, the scope of the present invention is determined by the claims which follow.

What is claimed is:

1. A method of separating dispersed salt ions soluble catalyst particles and solidified polymer particles from a flow of phenolic epoxy novolac or phenolic derivative epoxy resin intermediates by washing with water to selectively remove such impurities with the wash water comprising the steps of:

(a) through a water injection means, injecting a flow of water into the epoxy resin intermediate stream while forming the water flow into droplets for emulsifying in the epoxy resin stream wherein the droplets are sufficiently small so as to enhance diffusion between the phases; and (b) passing the epoxy resin stream with emulsified water droplets through an electrostatic coalescer means to extract water from the epoxy resin stream wherein the water carries the impurities therewith to discharge a stream of washed phenolic epoxy novolac or phenolic derivative epoxy resin intermediates having reduced impurity content.

2. The method of claim 1 including the step of adjusting the water flow rate and size of water droplets from said water injection means to form droplets of a specified size, and wherein the water droplets are controllably mixed with the epoxy resin stream and further wherein the pressure during mixing is controlled to a specified range to enable water droplets to disperse into the epoxy resin stream.

3. The method of claim 1 wherein said water extracting step separates water from the epoxy resin stream by exposing the emulsified water droplets to an electrostatic field separating droplets in the epoxy resin stream, and further wherein differences in water and density enhance separation.

4. The method of claim 3 including the step of separating droplets of water from the epoxy resin stream by permitting the heavier aqueous liquid to settle while the lighter epoxy resin rises in a container means.

5. The method of claim 4 wherein surface tension differences exist in the water and epoxy resin and including the step of electrostatically enhancing such differences to coalesce the water from the epoxy resin.

6. The method of claim 1 wherein the step of passing through an electrostatic coalescer means includes the step of forming a current flow from a central electrode through the liquid in a container.

7. The method of claim 6 including the step of flowing AC current between the central electrode and a surrounding ground electrode.

8. The method of claim 6 including the step of flowing DC current between the central electrode and a surrounding ground electrode.

9. The method of claim 1 including the step of adjusting the voltage across said coalescer means to vary voltage stress in on the dispersed phase liquids in said coalescer means.

10. The method of claim 9 wherein the salt ions are $Cl^-$ and are substantially removed in the water.

11. The method of claim 1 including the step of proving AC current between two electrodes in said coalescer means.

12. The method of claim 1 including the step of proving DC current between two electrodes in said coalescer means.

13. The method of claim 1 including the step of sizing an electrode in said coalescer means to control current flow.

14. The method of claim 1 including the step of settling solid particles to the bottom and removing such particles with a waste water flow.

15. The method of claim 1 including the step of adjusting the current flow as a function of solvent conductivity.

* * * * *